United States Patent [19]

Sumida et al.

[11] Patent Number: 5,137,255
[45] Date of Patent: Aug. 11, 1992

[54] CONTROL VALVE DEVICE

[75] Inventors: Mamoru Sumida; Osamu Matsumoto; Tetsuji Kondo, all of Hyogo, Japan

[73] Assignee: Mitsubishi Denki K.K., Tokyo, Japan

[21] Appl. No.: 714,523

[22] Filed: Jun. 13, 1991

[30] Foreign Application Priority Data

Jun. 15, 1990 [JP] Japan .................................. 2-157867
Jul. 31, 1990 [JP] Japan .................................. 2-205788

[51] Int. Cl.⁵ .............................................. F16K 31/04
[52] U.S. Cl. ................................. 251/77; 251/129.11; 251/129.05
[58] Field of Search ................. 251/77, 129.11, 129.05

[56] References Cited

U.S. PATENT DOCUMENTS

| | | | |
|---|---|---|---|
| 3,488,030 | 1/1970 | Hulme et al. | 251/129.05 X |
| 3,554,483 | 1/1971 | Kuwik et al. | 251/77 |
| 4,723,753 | 2/1988 | Torimoto et al. | 251/129.11 X |

FOREIGN PATENT DOCUMENTS 63-52938  4/1988  Japan .

Primary Examiner—Arnold Rosenthal
Attorney, Agent, or Firm—Sughrue, Mion, Zinn, Macpeak & Seas

[57] ABSTRACT

A control valve device for controlling flow rate, comprises: valve holder (31) linearly moved forward and backward by a driving unit (2), said valve holder serving as a converting mechanism for converting a rotary motion of driving means into a linear motion; valve piece (32) being supported by the front end of the valve holder while movable back and forth direction, and fitted into a valve seat (1b) when the valve holder advances toward the valve seat; and a spring (37) interposed between the valve piece and the valve holder for urging valve piece toward the valve seat.

7 Claims, 3 Drawing Sheets

CONTROL VALVE DEVICE

BACKGROUND OF THE INVENTION

The invention relates to a control valve device which controls the flow of liquids by driving the valve piece while converting the rotary motion of a stepping motor to a linear motion.

A conventional control valve device using a stepping motor converts the rotary motion of the stepping motor into a linear motion using a conversion mechanism so that the valve piece can reciprocate linearly. A control valve device of this type will be described with reference to FIG. 1.

FIG. 1 is a sectional view showing a conventional control valve device. In FIG. 1, the control valve device is formed of a valve body 1 and a drive unit 2 that is secured to the valve body 1. The valve body 1 includes a piping path 1a for causing a control liquid to flow therethrough and a valve seat 1b confronting a valve piece (described later). The drive unit 2 includes: a stepping motor 4 for rotating a rotor shaft 3; a holder 5 for converting the rotary motion of the rotor shaft 3 into a linear motion; and the valve 6 secured to the front end of the holder 5.

The rotor shaft 3 of the stepping motor 4 is rotatably supported by a bearing 8 and a bearing 10. The bearing 8 is arranged on an inner peripheral portion of a housing 7 that is secured to the valve body 1, and the bearing 10 is arranged on an inner peripheral portion of a cover 9 that covers the rear side of the housing 7. To the outer periphery of the rotor shaft 3 is a multipolar magnet 11 firmly attached by a mold 12 so that the magnet is concentric with the rotor shaft 3. On the outer periphery of the magnet 11 is a stator 13. Reference numeral 14 designates a coil of the stator 13; 15, a mold for protecting the coil 14 and a coil terminal 16; and 17, an externally connecting terminal that is connected to the terminal 16. A packing 18 is interposed between the housing 7 and the cover 9. A spring 19 serves to prevent the rotor shaft 3 from backlashing in the axial direction and is resiliently interposed between the cover 9 and the bearing 10.

The holder 5 made of a synthetic resin has a substantially cylindrical form and is supported so as to be inserted into the rotor shaft 3 while causing a portion on the rotor shaft 3 projecting from the housing 7 to pass therethrough. The valve piece 6 is inserted and secured to an opening of the holder 5 on the front end side. The valve piece 6 is also unitarily formed of the synthetic resin. The base portion on the side of the projecting portion on the rotor shaft 3 is provided with a male screw, while the inner peripheral portion of the holder 5 is provided with a female screw that can be screwed into the male screw. A guide 20 serves to regulate the rotation of the holder 5 by the rotary motion of the rotor shaft 3. The guide 20 is secured to the housing 7. More specifically, when the rotor shaft 3 is rotated by the stepping motor 4, the holder 5 not only gets screwed into the rotor shaft 3 but also is then kept from rotating by the guide 20. As a result, the rotary motion of the holder gets converted into a linear motion, thereby causing the holder 5 to travel along the length of the rotor shaft 3. A spring 21 serves to prevent the holder 5 from slightly moving back and forth due to backlash of the screwed portion, and is interposed between the holder 5 and the guide 20 so that the holder 5 can be urged to the front side (toward the valve seat 1b).

A stopper 22 serves to regulate the maximum advance position of the holder 5 and is held by a stopper ring 23 at an extreme end of the rotor shaft 3. Reference numeral 24 designates a stopper for regulating the maximum retreat position of the holder 5.

The control valve device thus constructed causes the holder 5 that is screwed into the rotor shaft 3 to travel frontward and backward by rotation of the stepping motor 4. This causes the valve piece 6 to move back and forth to change the distance between and valve seat 1b and itself, i.e., the surface area of a fluid path, thereby controlling the flow rate of the fluid flowing through the pipe path 1a. The maximum advance position of the valve piece 6 is regulated by the holder 5 being abutted against the stopper 22, while the maximum retreat position thereof is regulated by the holder 5 being abutted against the stopper 24.

Thus, in the conventional control valve device as constructed above, the valve piece 6 is moved by a predetermined distance intermittently (or "stepwise") using the stepping motor 4 as its drive unit. As a result, there arises a problem when the valve is to be closed completely. Specifically, it is difficult to bring the valve piece 6 into intimate contact with the valve seat 1b when completely closing the valve that is moving stepwise; or, in some cases, the valve piece 6 is not brought into contact with the valve seat 1b, leaving a gap therebetween. In such a case, although in complete closure, the flow of the fluid in the valve piece 6 cannot be completely shut off. If the valve piece 6 is advanced until it comes into contact with the valve seat 1b to check leakage, the valve piece 6 is forcibly pressed into the valve seat 1b, which is a problem.

SUMMARY OF THE INVENTION

The invention has been made in view of the above circumstances. Accordingly, an object of the invention is to provide a control valve device which can cutout the flow by eliminating the gap between the valve piece and the valve seat at the time the valve is completely closed.

To achieve the above object, the invention is applied to a control valve device, in which a valve piece is supported by a valve holder so as to be movable back and forth, and a spring for urging the valve piece toward a valve seat is disposed between the valve piece and the valve holder.

When the valve holder advances with the valve piece being fitted into the valve seat, the valve piece is held in the seating position by contraction of the spring.

More specifically, the control valve device for controlling flow rate, has a valve holder linearly moved forward and backward by driving means, the said valve holder serves as a converting mechanism for converting a rotary motion of driving device into a linear motion, a valve piece supported by the front end of the valve holder while movable in the back and forth directions. The valve holder is fitted into a valve seat when the valve holder advances toward the valve seat and a spring is interposed between the valve piece and the valve holder, for urging the valve piece toward the valve seat. In such a control valve device, the valve piece is urged toward the valve seat by a force derived from the spring interposed between the valve piece and the holder, and once the valve piece has been abutted against the valve seat, predetermined "dummy" steps in a complete closure direction are given to the stepping motor within such a range as not to impede the function of the mechanism for converting the rotary motion into a linear motion.

In the invention, the valve is urged relative to the holder toward the valve seat by the spring. Therefore, when the valve has closed the valve seat completely, the valve compresses the spring so that the spring can absorb the amount of its movement, thereby eliminating the gap between the valve seat and itself.

BRIEF DESCRIPTION OF THE DRAWINGS

FIGS. 3A and 3B are sectional views illustrative of the operation of a valve and a valve seat, of which FIG. 3A shows a state of the valve and the valve seat immediately before their complete closure and FIG. 3B shows a state thereof at the time of their complete closure;

FIGS. 5A and 5B are sectional views illustrative of the operation of a valve and a valve seat, of which FIG. 5A shows a state of the valve and the valve seat immediately before their complete closure and FIG. 5B shows a state thereof at the time of their complete closure.

DETAILED DESCRIPTION OF THE PREFERRED EMBODIMENTS

An embodiment of the invention will be described in detail with reference to FIGS. 2, 3A, and 3B.

Figure 1:
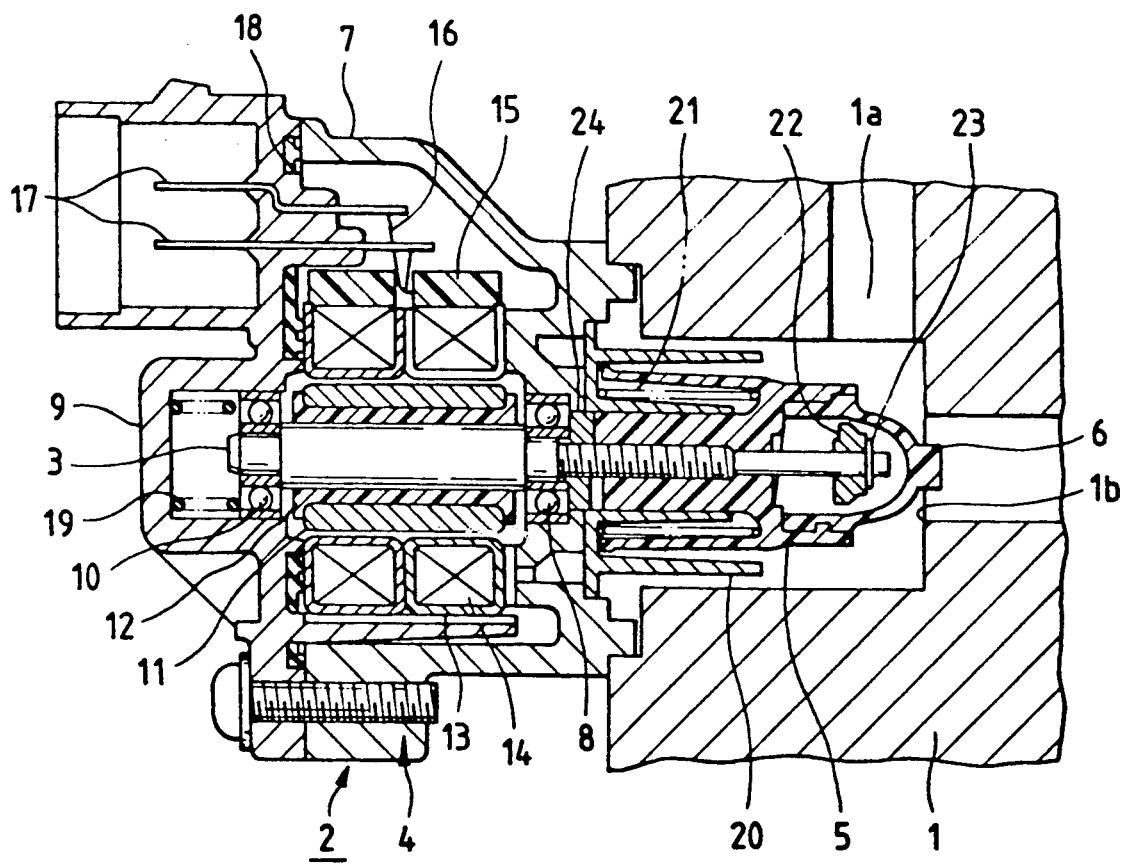
FIG. 1 is a sectional view showing a conventional control valve device.
Figure 2:
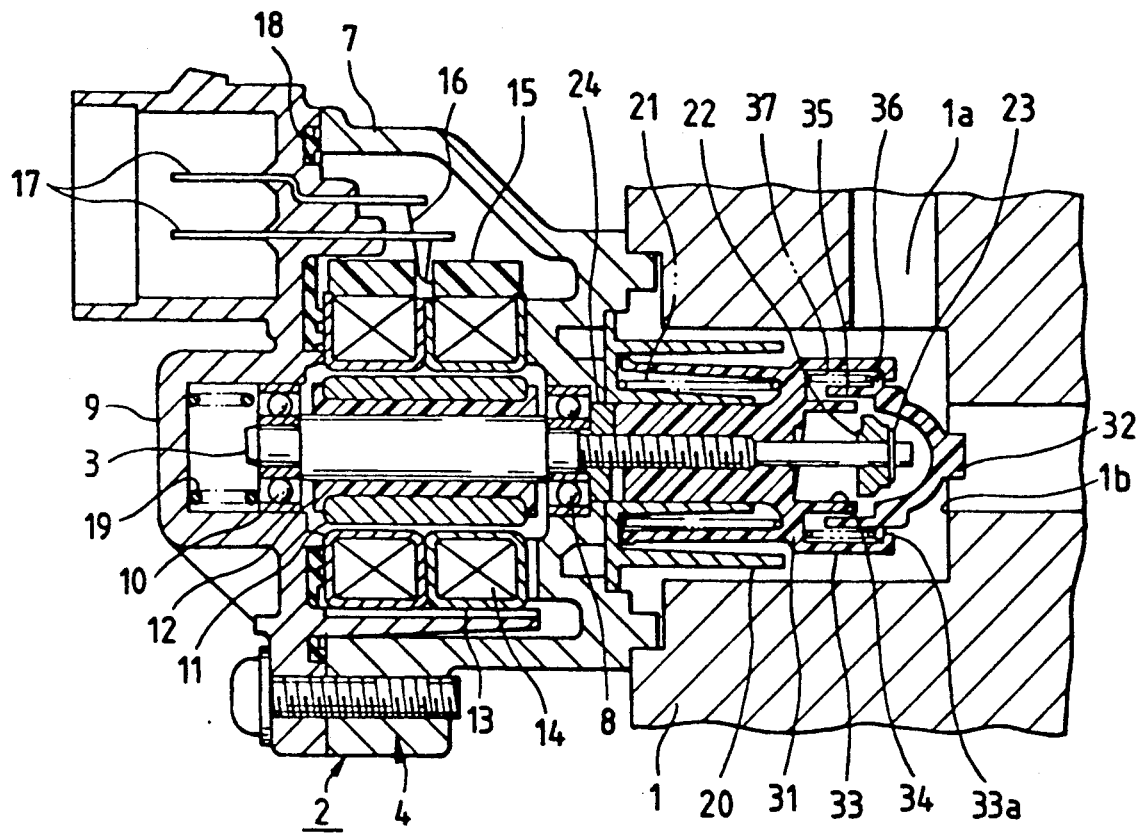
FIG. 2 is a sectional view showing a control valve device according to the present invention.
Figure 3A:
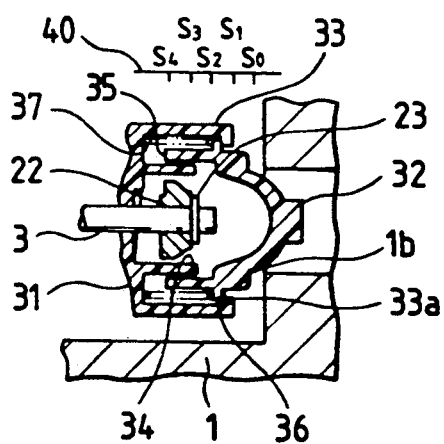
Figure 3B:
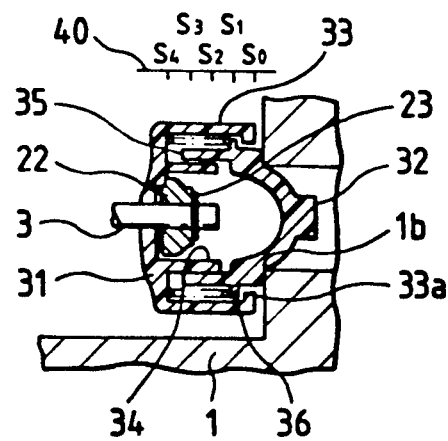

FIG. 2 is a sectional view showing a control valve device, which is an embodiment of the invention; and FIGS. 3A and 3B are sectional views illustrative of the operation of a valve and a valve seat, of which FIG. 3A shows a state of the valve and the valve seat immediately before their complete closure and FIG. 3B shows a state thereof at the time of their complete closure. In FIGS. 2, 3A, 3B, same reference numerals as in FIG. 1 designate same or like parts and components. In FIGS. 2, 3A, 3B, reference numeral 31 designates a holder for use in the embodiment of the invention; and 32, a valve for the same.

The holder 31 has a substantially cylindrical form as the conventional example and includes, on an inner peripheral portion, a female screw to be screwed with a male screw of a rotor shaft 3. The holder 31 is supported by the rotor shaft 3 while inserted thereto. At the front end of the holder 31, an outer sleeve 33 and an inner sleeve 34 for holding the valve 32 are formed. Around an opening edge at the front of the outer sleeve 33 is a collar 33a arranged to prevent the valve from being dropped. In this embodiment, the collar 33a has a notch (now shown) so that a valve stopper (described later) can be fitted therewith.

The valve 32 has a cylindrical guide 35 at its rear end, the guide being inserted into the gap formed between the outer sleeve 33 and inner sleeve 34 of the holder 31. On an outer peripheral portion of the valve 32, a stopper 36 is formed to be fitted with the collar 33a of the outer sleeve 33. Once the guide 35 has been inserted into the gap between the outer sleeve 33 and the inner sleeve 34 and the stopper 36 has been fitted with the collar 33a, the valve 32 can be supported by the holder 31 so as to be both movable back and forth and rotatable.

A compression coil spring 37, which serves to urge the valve 32 toward a valve seat 1b, is inserted into the gap between the outer sleeve 33 and the inner sleeve 34 concentrically therewith, and its rear end and its front end are attached to the holder 31 and the valve 32 so as to come in pressure contact therewith, respectively.

To mount the valve 32 on the holder 31, the rotor shaft 3 is first screwed into the holder so that the holder is supported by the rotor shaft, and under such condition, a stopper 22 is attached to the front end of the rotor shaft 3. Then, the compression coil spring 37 is inserted into the gap between the outer sleeve 33 and the inner sleeve 34, and the stopper 36 is fitted into the collar 33a from outside, so that the valve 32 can be mounted on the holder 31. When fitting the stopper 36 into the collar 33a, the stopper is compressed by the compression coil spring 37.

An operation of the valve 32 will be described next. Upon activation of the stepping motor 4, the rotor shaft 3 starts rotating stepwise. Since the holder 31 has been screwed into the rotor shaft 3, the holder 31 moves linearly along the length of the rotor shaft 3 stepwise. To completely close the valve 32, the holder 31 must be advanced. Until the valve 32 is abutted against the valve seat 1b, the valve 32 is positioned at the farthest front position by the compression coil spring 37 as shown in FIG. 3A. In FIGS. 3A and 3B, reference numeral 40 designates a virtual scale for a description of the positions of the holder 31 and the valve 32. The holder 31 successively moves stepwise as indicated by points $S_4$ to $S_0$ in the scale 40, and is completely closed by advancing from the point $S_1$ to the point $S_0$ as shown in FIG. 3B. The valve 32 is stopped while fitted into the valve seat 1b before the holder 31 reaches the point $S_0$. Although the holder 31 continues to advance even if the valve 32 has been stopped, the valve 32 is maintained while fitted into the valve seat 1b (in complete closure) because it acts to face the inner surface of the outer sleeve 33 while resisting the resilient force of the compression coil spring 37. More specifically, once the valve 32 has been abutted against the valve seat 1b, the valve 32 is brought into pressure contact with the valve seat 1b by the resilient force of the compression coil spring 37. To open the valve 32, the holder 31 is retreated by reversing the above-described operation. When the holder 31 retreated from the completely closed position, the resilient force of the compression coil spring 37 is applied to the valve 32 until the collar 33a of the holder 31 is abutted against the stopper 36 of the valve 32. As a result, the valve 32 maintains its completely closed position until then.

Therefore, after the valve 32 has been fitted into the valve seat 1b during the valve closure operation, the valve 32 escapes into the holder 31 by compressing the compression coil spring 37. As a result, no such force as to forcibly bias the valve 32 to the valve seat 1b is applied any longer to the valve 32.

As described above, in the control valve device of the invention, the valve piece is supported by the valve holder so as to be movable back and forth and a spring is interposed between the valve piece and the valve holder so as to bias the valve piece toward the valve seat. Thus, when the valve holder advances with the valve piece being fitted into the valve seat, the spring is compressed, thereby keeping the valve piece in the seating position. Therefore, the valve piece can be fitted into the valve seat while preventing such a force as to forcibly bias the valve piece to the valve seat from being applied to the valve piece when the valve has been completely closed. Thus, although the control valve device is such that the valve piece moves by a predetermined distance intermittently, it is ensured that leakage of the fluid can be prevented when the valve is in its complete closure position.

Figure 4:
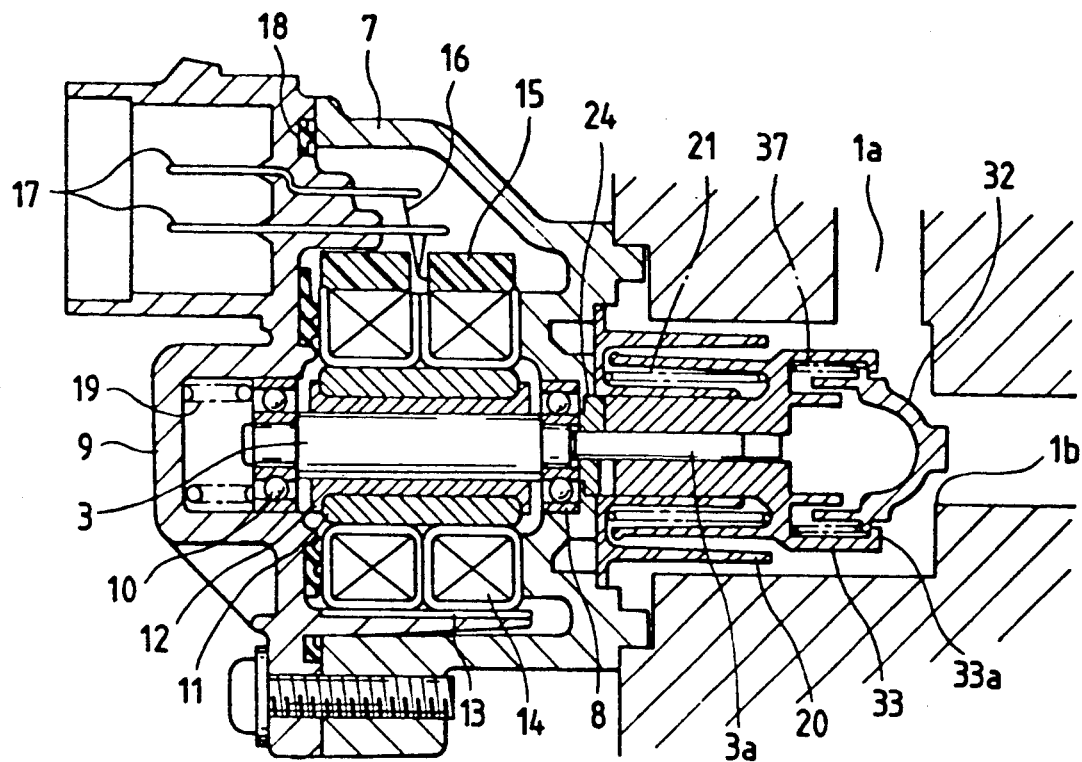
FIG. 4 is a sectional view showing another control valve device according to the present invention.
Figure 5A:
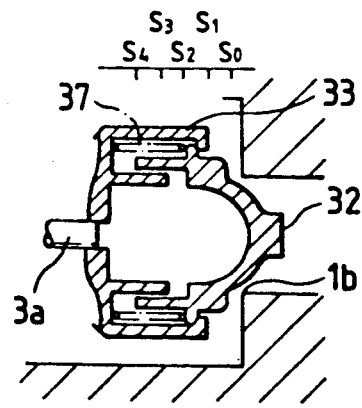
Figure 5B:
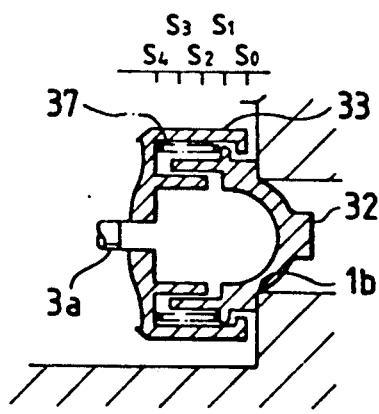

Another embodiment of the invention will be described with reference to FIGS. 4, 5A, and 5B.

In the previously-described embodiment, the complete closure position of the valve 32 is mechanically maintained by causing the stopper secured to the rotor shaft 3 to be abutted against the holder, once the steps required for causing the valve 32 to be abutted against the valve seat 1b have been given to the stepping motor. This arrangement addresses such problems as the increase in the number of parts used to mount the stopper, the reliability of the fixed portion of the stopper, and the reliability of the interfacing portion between the stopper and the holder. To overcome these problems, this embodiment includes no stopper, and allows the axial portion 3a of the rotor shaft 3 to be minimized. Specifically, the number of steps required to cause the valve 32 to be abutted against the valve seat 1b can be set optionally. Thus, if a number of steps with a safety factor taken into account is set within such a range as not to impede the function of the rotary motion-linear motion conversion mechanism, then no stopper is required to keep the valve in the complete closure position. In addition, to detect the position of the valve 32, the number of steps instructed by a computer based on the complete closure position as a reference may be counted.

As described in the foregoing, the invention is so constructed that the valve is biased relative to the holder toward the valve seat by the spring, thereby keeping the valve to be in the complete closure position while causing the valve to be abutted against the valve seat. As a result, the flow rate of a fluid can be zeroed when the valve is in its complete closure position. In addition, the omission of the stopper contributes to down-sizing the valve device as a whole and improving its reliability.

What is claimed is:

1. A control valve device, for controlling flow rate, comprising:
   a valve holder linearly moved in forward and backward directions by a driver which is operatively engaged with said valve holder, said valve holder being operatively engaged with said driver so as to convert rotary motion of said driver into linear motion;
   a valve piece being supported at said one end of said valve holder, in a slidable manner, so as to be movable in said forward and backward directions, and fitted into a valve seat when said valve holder advances toward said valve seat; and
   a spring interposed between said valve piece and said valve holder so as to bias said valve piece toward said valve seat;
   said valve holder (31) including an outer sleeve (33) and an inner sleeve (34) at a first end thereof so as to hold said valve piece (32), and a collar (33a) is disposed on said outer sleeve (33) to prevent said valve piece (32) from dropping.

2. A control valve device as claimed in claim 1, wherein said driver comprises a stepping motor coupled with said valve holder so as to advance said valve holder, after said valve piece (32) has been abutted against said valve seat, through predetermined dummy steps in a complete closure direction so as to advance said valve holder against a biasing force of said spring.

3. A control valve device as claimed in claim 1, wherein said valve holder (31) has a substantially cylindrical form, in which an inner peripheral portion is threaded so as to be screwed with a thread of a rotor shaft (3) of said driver.

4. A control valve device as claimed in claim 1, wherein said valve piece means (32) has a cylindrical guide (35) at its rear end so as to be inserted between said outer sleeve (33) and inner sleeve (34), and a stopper (36) to be fitted with said collar (33a).

5. A control valve, comprising:
   a driver having a rotating shaft;
   a valve holder operatively engaged with said shaft so as to move in first and second directions in response to rotation of said shaft, said first direction being opposite said second direction, said valve holder comprising a first sleeve and a second sleeve which is disposed concentrically with said first sleeve so as to define an annular space therebetween;
   a valve piece adapted to be fitted into a valve seat when said valve is in a closed position, said valve piece having a cylindrical portion which is slidably disposed in said annular space;
   a flexible element disposed between said valve holder and said valve piece so as to bias said valve piece towards said valve seat.

6. A control valve as claimed in claim 5, further comprising:
   a salient portion disposed on said valve holder;
   an engagement portion disposed on said valve piece so as to prevent said cylindrical portion from entirely exiting said annular space.

7. A control valve as claimed in claim 6, wherein said salient portion is a collar extending around an inner peripheral edge of said valve holder and wherein said engagement portion is a stopper which is engageable with said salient portion.

* * * * *